E. SWANSON.
NEST.
APPLICATION FILED JUNE 18, 1913.
1,089,984.
Patented Mar. 10, 1914.
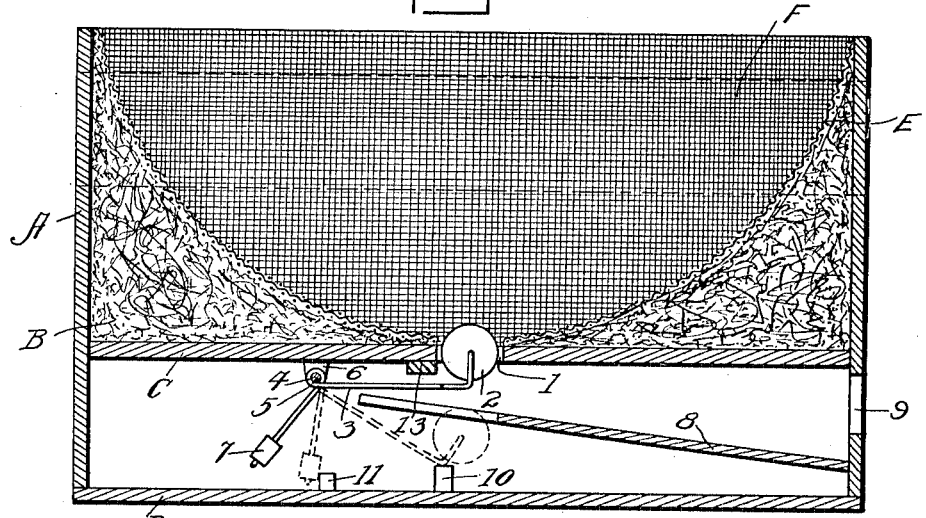
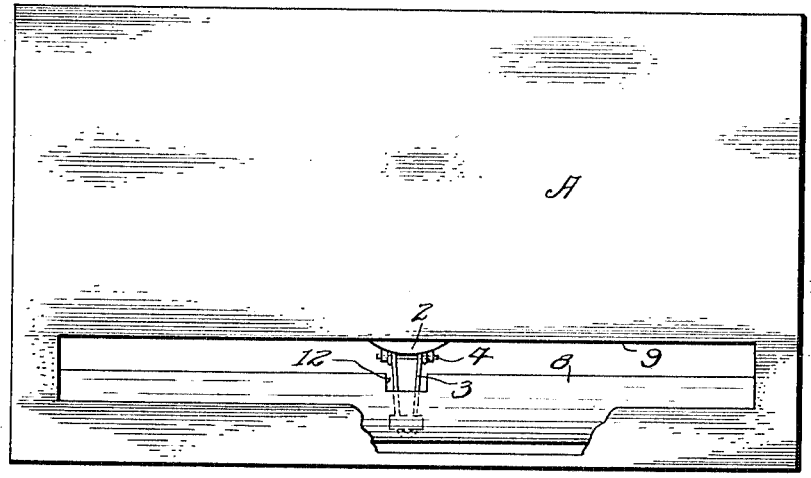
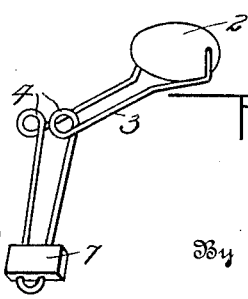

UNITED STATES PATENT OFFICE.

EMIL SWANSON, OF BOONE, IOWA.

NEST.

1,089,984. Specification of Letters Patent. Patented Mar. 10, 1914.

Application filed June 18, 1913. Serial No. 774,403.

*To all whom it may concern:*

Be it known that I, EMIL SWANSON, a subject of the King of Sweden, residing at Boone, in the county of Boone and State of Iowa, have invented certain new and useful Improvements in Nests, of which the following is a specification.

This invention appertains to that type of hens' nests wherein the nest is provided at the bottom with a movable egg controlling member in the nature of a conveyer adapted, when an egg is laid, to be operated by the weight of the egg to deliver the latter into a delivery compartment located beneath the nest.

The invention resides particularly in the peculiar mounting of the movable member aforesaid, which comprises a nest egg when in operative position, and the provision of an inclined platform along which the laid egg is adapted to pass to a point proximate to a suitable opening by which access is had to the delivery chamber.

For a full understanding of the present invention, reference is to be had to the following description and to the accompanying drawings, in which—

Figure 1 is a transverse sectional view through a device constructed in accordance with my invention. Fig. 2 is a front view of a box or casing containing the hen's nest, and showing more clearly the delivery opening and platform, the front side of the box or casing being broken away. Fig. 3 is a detail perspective view of the nest egg and its supporting lever.

Throughout the following detail description and on the several figures of the drawings, similar parts are referred to by like reference characters.

In the drawings, A denotes a casing or box that may be of any suitable construction, and is preferably made of wood or metal to afford a substantial inclosure for the nest B. The nest B is of straw and is an ordinary hen's nest, the same being supported upon a false bottom C, consisting of a horizontal partition in the casing A. The member C is spaced from the bottom proper D of the casing A and an opening 1 is provided in the part C to permit the passage of an egg laid in the nest B to the compartment or chamber beneath said nest, said compartment being formed by the space between the parts C and D. In order to hold the straw in its proper shape, I preferably employ a semi-circular shaped screen or mesh E which may be painted or otherwise stained of a color similar to the straw, the latter being packed around the screen, and a door F, shown in dotted lines in Fig. 1, is provided at either side of the box to afford convenient access for this purpose. The opening 1 is located at a point centrally of the bottom of the nest B and arranged in said opening is a movable member comprising a nest egg 2 of porcelain or the like. The member 2 is provided with openings at its opposite ends into which are received the ends of a lever 3 comprising a piece of wire bent back upon itself with its side members in spaced relation to each other. Said side members are also bent to form the pivot eyes 4 mounted upon the pivot 5 in a suitable bracket 6 on the under side of the false bottom C. The free end or arm of the lever 3 is pendent from the bracket 6 and carries the weight 7. The weight 7 is sufficiently heavy to hold the nest egg 2 in the opening 1 so that said egg virtually forms a movable closure for said opening.

In the practical use of the invention, when the hen has laid an egg, the latter will be deposited, necessarily, in the nest B, and by reason of the shape of the same it will roll against the nest egg 2. Since the weight 5 is only heavy enough to just overbalance the member 2 when the latter is free to move upwardly, the additional weight of the egg deposited against the same will cause the latter to gravitate or move downwardly, simultaneously raising the weight 5 in an obvious manner. The said downward movement of the member 2 automatically conveys the egg gradually out of said receptacle on to an inclined platform 8 which is located beneath the opening 1 and inclines downwardly and outwardly toward a delivery opening 9 at the front of the delivery compartment of the casing. As soon as the egg passes onto the platform 8 said egg will roll downwardly toward the opening 9 ready to be removed at any time by one gathering the eggs. The platform 8 may be covered with straw so as to avoid any liability of breakage of the egg, but such liability is decreased to a minimum owing to the fact that the egg remains in frictional or rolling contact with the member 2 and the edge of the opening until the platform is reached. The horizontal supporting arm of the lever 3 is adapted to engage a buffer 10 to limit the downward movement of the member 2, and upward movement of said member 2 when disengaged from the natural egg is limited by the weight 7 engaging a second stop member 11 in the rear of the buffer 10. As will be observed most clearly by reference to Fig. 2, the platform 8 is provided with a notch or cut-out portion 12 just beneath the supporting arm of the lever 3 and the nest egg 2, which permits the latter to pass beneath the platform as it gradually yields to the weight of the natural egg, the descent of which it is resisting, and in order that the egg may not roll backward as it descends, a block or similar stop 13 is secured to the false bottom C at the rear edge of the opening 1.

By the use of the simple mechanism hereinbefore described, the removal of eggs from a nest is considerably facilitated, it being well known that very frequently after a hen has laid an egg, she becomes very obdurate, in so far as leaving the nest is concerned, owing to a desire to set, and some difficulty is thus created in the procurement of freshly laid eggs.

Having thus described the invention, what is claimed as new is:

1. In combination, a casing having a false bottom dividing the same into upper and lower compartments, a nest in the upper compartment, said false bottom having an opening leading into the lower compartment, a rotatable egg conveying member at said opening, movable means for supporting the conveying member consisting of a lever bent into angular form and having its horizontal arm pivotally supporting the member aforesaid, a support for said lever pendent from the false bottom, a weight carried by the other arm of said lever and normally tending to hold the egg conveying member elevated and closing the opening aforesaid, a delivery platform arranged beneath the conveying member and inclined downwardly toward one end, said platform having a cut-out portion to permit passage of the conveying member to a point beneath said platform, and a buffer arranged in said casing and co-acting with the horizontal arm of the lever to limit the downward movement of the conveying member, said last-mentioned member having rolling contact with the egg deposited in the upper compartment as it is gradually conveyed to the platform in the lower compartment.

2. In combination, a casing having a false bottom dividing the same into upper and lower compartments, said bottom having a central opening therein, a nest supported on said bottom in the upper compartment, an angular shaped lever comprising a piece of wire bent back upon itself and formed with pivot eyes intermediate its length, a pivot for said lever carried by the false bottom aforesaid, said lever having a horizontal supporting arm extending beneath the latter, a movable nest member supported between the free ends of the wire, said lever being also provided with a pendent arm, a weight carried by the pendent arm, a platform inclining outwardly and downwardly toward the front of the casing, and situated beneath the movable nest member to receive the egg conveyed thereby as the latter yields downwardly under weight of the egg, said platform having a notch at its rear edge portion to permit the passage of the movable nest member to a point beneath said platform and allow the egg to pass gradually thereonto, a block member secured adjacent the opening in the false bottom to prevent rearward movement of the egg in passing through said opening, and stop members carried by the bottom of the lower compartment and adapted to limit downward movements of the supporting and pendent arms respectively.

In testimony whereof I affix my signature in presence of two witnesses.

EMIL SWANSON.

Witnesses:
ANTON JOHNSON,
MARTIN WESTBERY.

---

Copies of this patent may be obtained for five cents each, by addressing the "Commissioner of Patents, Washington, D. C."